United States Patent [19]

Gainer et al.

[11] 4,172,178

[45] Oct. 23, 1979

[54] IMPREGNATED CASTINGS CHEMICALLY RESISTANT TO CONTACT WITH HALOCARBON REFRIGERANT

[75] Inventors: Gordon C. Gainer, Penn Hills; Russell M. Luck, Monroeville, both of Pa.

[73] Assignee: Westinghouse Electric Corp., Pittsburgh, Pa.

[21] Appl. No.: 903,376

[22] Filed: May 5, 1978

[51] Int. Cl.$^2$ .......................... B05D 3/06; B32B 5/08; B32B 31/28
[52] U.S. Cl. ..................................... 428/458; 427/35; 427/36; 427/44; 427/54; 427/55; 427/388 A; 428/461
[58] Field of Search .................... 156/272; 427/35, 36, 427/44, 54, 55, 388; 428/458, 461

[56] References Cited

U.S. PATENT DOCUMENTS

| | | | |
|---|---|---|---|
| 2,807,155 | 9/1957 | Williamitis | 252/56 R |
| 2,961,258 | 11/1960 | Donley et al. | 277/96 |
| 3,644,161 | 2/1972 | Hall | 156/272 |
| 3,878,112 | 4/1975 | Luck et al. | 252/10 |

OTHER PUBLICATIONS

"New Methods in Impregnation of Oil Castings," Impco Inc. Tech. Paper No. 2272, 1972 SDCE Oil Casting Congress.

*Primary Examiner*—J. C. Cannon
*Attorney, Agent, or Firm*—D. P. Cillo

[57] ABSTRACT

A metal casting, containing connected pores, is impregnated with a halocarbon resistant barrier resin, consisting essentially of the admixture of a polyester resin, and from about 1 wt. % to about 70 wt. % of a polyfunctional monomer modifier selected from the group consisting of trimethylolpropane triacrylate, divinyl benzene, pentaerythritol triacrylate or their mixtures, which after curing provides a casting which is resistant to chemical and solvent attack by chlorodifluoromethane and dichlorodifluoromethane and which is impervious to gases and liquids.

9 Claims, 3 Drawing Figures

IMPREGNATED CASTINGS CHEMICALLY RESISTANT TO CONTACT WITH HALOCARBON REFRIGERANT

BACKGROUND OF THE INVENTION

The present invention relates to novel barrier impregnants for metal refrigeration compressor castings, which prevent refrigerant gas and lubricant leakage through the casting wall, and which are resistant to contacting lubricant and/or halocarbon refrigerant, particularly to chlorodifluoromethane and dichlorodifluoromethane.

Williamitis, in U.S. Pat. No. 2,807,155, and Luck et al., in U.S. Pat. No. 3,878,112, teach lubricant-refrigerant systems for refrigeration compressors. The compressor housings are made from several ferrous castings. Generally, these cast housings cannot be leak tested until after machining and assembly. Only rarely will a faulty, porous casting, subject to refrigerant gas and lubricant leakage, be revealed during the machining process. The only recourse in the past, has been to reorder the casting from the supplier, machine it, and use it as a replacement. This, in the past, has caused a substantial time loss, and resulted in costly delays in completion and delivery of the compressor unit. Frequently, penalty costs are assessed by the customer for failure to deliver refrigeration units on time. In many instances, allowances are not given by the foundries for unsatisfactory castings.

In operation, lubricating petroleum base oils, and refrigerant solutions and gases contact the inside of the cast, ferrous housing, which contains the refrigeration compressor apparatus. These lubricating oils, especially during cold start-up, at about 20° C. to 25° C., contain a substantial amount of dissolved, chemically reactive halocarbon refrigerant, such as dichlorodifluoromethane gas (R12) or chlorodifluoromethane gas (R22). As a class, these refrigerants are powerful solvents for many organic polymers. The R22 is particularly reactive, having high solvency power, and is used primarily in reciprocating compressors. A large portion of the chlorofluorocarbon refrigerant dissolves in and remains in the oil until compressor operating temperatures of about 65° C. are reached. As temperature increases, large amounts of the refrigerant will boil out of the oil and contact almost all the portions of the inside housing walls in the gas phase, under high pressure, i.e., over 100 psi.

Any processing of the inside porous interior of the castings, must effectively resist the chemical and solvent attack and degrading activity of the oil lubricant and/or refrigerant, and their solutions, at operating temperatures in excess of 65° C. The chemical stability of any surface and porous interior treatment of the casting is critical, since the refrigeration system must be hermetically sealed at all times and reactions which denature, dissolve or destroy any of the solid material could transfer and redeposit elsewhere in the system, and thus plug up tubing, which would be fatal to the compressor operation.

Donley et al., in U.S. Pat. No. 2,961,258 teaches solid polyester resin jacket sealing units, for shafts and bearings used in pumps. These jackets are highly resistant to chemical attack from acids, alkalis and other corrosive chemicals. Hall, in U.S. Pat. No. 3,644,161, teaches radiation cured polyester resin metal coatings and films, containing monomers such as styrene, vinyl toluene, methyl methacrylate, divinyl benzene, ethyleneglycol diacrylate, tetraethyleneglycol diacrylate, trimethylolpropane triacrylate, trimethylolpropane trimethacrylate, and hydroxyethyl acrylate, among others, to aid in cross-linking. Such films, generally air inhibited, are made high energy radiation curable, to provide surface coatings.

As described in "New Methods In Impregnation of Die Castings", Impco Inc. Tech. Paper No. 2272, (presented at the 7th SDCE Die Casting Congress in 1972, by Gebhard and Scott), vacuum pressure impregnation of porous castings, with a resinous material is taught. The impregnation is followed by removal of surface resin and curing of the resin deposited in the porous casting interior, in an attempt to solve the leaking casting problem. The resins commonly used are polyester resin solutions and epoxy resins, containing no inert solvents, and producing very low or essentially no gaseous or liquid by-products on curing. The resins must meet the requirements of having good wetability and possess a low viscosity. It has been shown that these resins alone, however, are not particularly resistant to chemical and physical attack of chlorodifluoromethane gas (R22), alone or in solution petroleum oil.

SUMMARY OF THE INVENTION

The present invention solves the above-described problems, by providing modified polyester impregnated castings, which are resistant to the chemical and solvent attack of R22 and R12. The casting can be used as part of a housing for a refrigeration apparatus, containing contacting oil lubricant and reactive halocarbon refrigerant. The polyester resin, used to impregnate the metal casting components, or other types of porous substrates, consists of a typical, general purpose unsaturated polyester resin, generally containing a reactive solvent diluent comprising a monofunctional vinyl monomer, preferably comprising styrene, in an amount effective to keep the viscosity of the polyester below about 3,000 cps. at 25° C. This polyester system will contain from about 1 wt.% to about 70 wt.% of a polyfunctional monomer modifier, selected from the group consisting of trimethylolpropane triacrylate, divinyl benzene, pentaerythritol triacrylate and their mixtures. The final modified resin, containing the polyfunctional monomer, must have a viscosity below about 1,000 cps. at 25° C. Addition of the polyfunctional monomer is effective to achieve this result.

This modified, polyester resin impregnant can effectively plug and repair defective porous castings, which are anywhere up to about 35% porous, generally about 0.01% to about 25% porous, thus making them impenetratable by oil or other liquids or gases. The modified resin can withstand R22 refrigerant gas and R22 refrigerant-petroleum oil lubricant solution contact for long periods of time, at temperatures of up to about 185° C., without any substantial chemical or thermal degradation. The resins of this invention, importantly, also have a storage life of over about 6 months, i.e., they will remain below about 1,000 cps. at 25° over a 6 month period.

Such a long storage life is essential, since thousands of gallons of the modified polyester resin are required to completely submerge some huge faulty, porous castings in a typical vacuum impregnation process. The impregnating resin is returned to storage for reuse, and only the resin which is actually impregnated into the pores and fissures is replaced. If the final, modified resin viscosity is over about 1,000 cps. at 25° C., or begins to polymerize in storage, it must be discarded. After impregnation, the castings are washed lightly of resin clinging to the surface, then heated, generally in an oven or in hot oil, to between about 110° C. and 175° C., to cure the polyester resin impregnant, remaining in the porous interior of the faulty casting, thus forming an oil, liquid and gas impervious barrier within the pores of the casting wall.

BRIEF DESCRIPTION OF THE DRAWINGS

For a better understanding of the invention, reference may be made to the preferred embodiment, exemplary of the invention, shown in the accompanying drawings in which.

DESCRIPTION OF THE PREFERRED EMBODIMENTS

Figure 1:
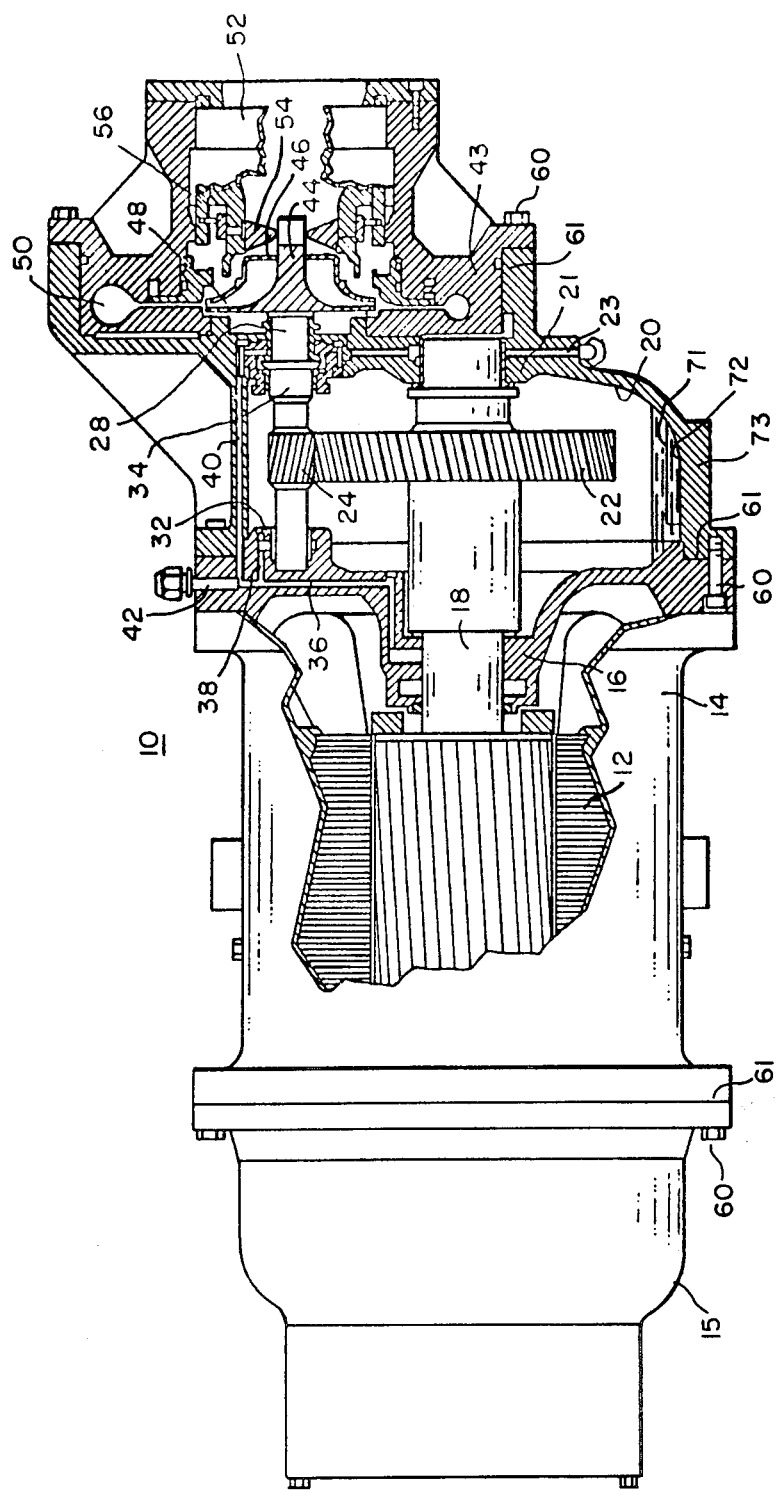
FIG. 1 is a vertical cross-section through the casting of one type of a centrifugal refrigeration compressor.

Referring now to FIG. 1 of the drawings, there is shown a vertical cross-section through a portion of a refrigeration apparatus, such as a typical centrifugal refrigeration compressor 10, contained within a housing consisting of several connected castings. The refrigeration compressor comprises a motor 12, for example from 50 to 1,000 horsepower, within a motor housing casting 14. The casting 14, usually made of cast iron, has a complex geometry, and is machined and finished to include bearings in which is mounted a motor drive shaft 18 extending through a bearing 16 into a gear compartment casting 20, with the right-hand end of the shaft being supported in a bearing 21. The portion of the shaft 18 in the gear compartment casting 20 is provided with a large driven helical spur gear 22 driving a smaller gear 24 affixed to a centrifugal impeller shaft 28. The ends of centrifugal impeller shaft 28 are mounted in bearings 32 and 34. An end cap access casting is shown as 15.

Lubricant oil is supplied to the bearings 16, 32, 34 through channels 36, 38 and 40 from a main lubricant manifold 42. Bearing 21 is lubricated by a lubricant manifold 23. Because of the high speeds, typically 25,000 to 36,000 RPM., and high power being transmitted to the impeller, it is mandatory that a large volume of lubricant be supplied to the bearings at all times during the operation of the compressor. An oil or lubricant mist escapes from bearings 16, 21, 32 and 34 by reason of shaft clearances into the gearing casing 20, where it contacts and coats the casting sides; the high speed of the shaft 28, in particular, throwing out the oil as a mist which impinges on and lubricates the gear teeth of gears 22 and 24.

Upon the extreme right-hand end of the shaft 28, in the impeller housing casting 43, is mounted a centrifugal compressor impeller 44 having an inlet end 46 adjacent the right-hand end of the shaft hub, and an exit portion 48 at which hot compressed refrigerant gases are expelled under pressure into a refrigerant gas manifold 50 from where they flow to a suitable condenser (not shown). Refrigerant gas, from the evaporator (chiller), not shown, enters through a relatively large gas inlet conduit 52 at the extreme right-hand end of the compressor.

Admission of the halocarbon gas in conduit 52 to the inlet 46 of the compressor is controlled by a series of circumferentially positioned guide inlet vanes 54 pivotally mounted in the conduit 52 in front of the inlet end of the centrifugal impeller. The vanes 54 are rotated to a desired gas flow control position by a piston member 56 having portions affixed to eccentrically placed pins on the vanes 54, which piston member moves in response to admission of lubricant under pressure to one or the other end thereof in response to amounts of refrigerant needed as determined by a vane control sensor mechanism (not shown) to move the vanes 54 to any position between fully open and a substantially closed position. Consequently, flow of halocarbon refrigerant gas to the centrifugal impeller is controlled by this vane and piston mechanism.

In order to secure a high output from the electrical motor 12, it is a common practice to spray condensed, liquid halocarbon refrigerant on the motor windings, in order to absorb heat therefrom, so that the motor will be cooled adequately to a safe operating temperature when high electrical power input is applied thereto. Because of this enhanced cooling, an extremely small size motor can be employed to deliver the necessary horsepower to the centrifugal compressor proper.

As shown in FIG. 1, the compressor comprises a plurality of castings, 14, 15, 20 and 43, connected together by bolts 60, at a plurality of contact joints 61. Lubricating oil 71 may contain between 1 vol. % to 50 vol. % generally, and in some instances, as high as 99 vol. % of dissolved halocarbon refrigerant gas, depending on time, temperature and pressure. The refrigerant oil solution and gas will contact the interior casting surface at various places, such as at 72, where it can permeate through any pores in the casting wall at 73, if the casting is porous and faulty to any degree at that point.

In accordance with this invention, all of the interior casting surfaces, and generally the exterior casting surfaces and pores are vacuum pressure impregnated with the modified polyester resin of this invention. While the description above has been specifically directed to a centrifugal compressor casting, it is to be understood that any other type casting, made from a variety of metals, which are used to house a refrigeration apparatus or system, such as a hermetic reciprocating compressor casting system, can be impregnated with the modified polyester resin in accordance with this invention.

Refrigerant systems utilizing halocarbon refrigerants, such as dichlorodifluoromethane, and especially chlorodifluoromethane, require specialized lubricants. These lubricants must be resistant to thermal and chemical decomposition at high temperatures present during gas compression, in the presence of the halocarbon. Many air conditioning units employ chilled water, produced by a heat exchanger associated with the compressor, to effect suitable conditioning of the air. The start-up of a centrifugal unit from a cold condition, normally 15° C. to 24° C., to a fully operational condition often takes several hours. Preheating of the refrigerant oil solution is generally necessary to drive out some of the refrigerant gas. Usually, a separate oil pump unit is first set in operation to deliver a flow of preheated lubricating oil to the bearings, gears, and oil-operated control mechanism. Only after an adequate flow and predetermined oil pressure is established, is the centrifugal compressor put into operation.

This prolonged delay in a cold start occurs because of the high solubility of the halocarbon refrigerant in any of the otherwise satisfactory lubricating petroleum base oils used for lubricating the bearings and gearing of the centrifugal compressor. The halocarbon refrigerant comes into contact with the lubricant in the normal operation of the centrifugal compressor. Large volumes of halocarbon gas dissolve in the cold lubricating oil, because the solubility of the halocarbon gas increases as temperature drops. When the oil is being pumped to the compressor rotor and bearings, the dissolved halocarbon refrigerant readily boils out as a gas. The refrigerant gas contacts all the interior walls of the compressor castings, and subjects resins impregnated into the casting pores to chemical attack, causing denaturation and possible complete dissolution and solvent attack, causing swelling over long periods of time. These conditions are further aggravated as the temperature increases in the refrigeration system.

On a cold start-up, halocarbon boils out of the oil lubricant to produce large volumes of foam, both in the sump and in the oil lines, as well as in the bearings and at other places in the oil circuit when the oil pump is set into operation to convey oil or lubricant to the bearings, gears, and elsewhere. The modified polyester resin impregnant in the pores of the interior walls of the refrigeration casting must be chemically resistant to such highly reactive, halocarbon concentrated lubricating oil, foams, or gas, otherwise the resin will slowly swell, and chemically and physically degrade and crack, and possibly dissolve, allowing oil and refrigerant leakage through the casting wall.

The lubricating oil used in refrigeration compressors comprises highly refined petroleum products having viscosities generally below about 700 SUS at 38° C. These oils, such as Suniso 4GS, and in larger machines, Suniso 5GS, are well known in the art. The synthetic diricinoleic acid esters of selected glycols, described in U.S. Pat. No. 3,878,112 are also used successfully, as well as any other effective, proper viscosity oil or oil lubricant mixture having good chemical and thermal stability in contact with halocarbon refrigerants. Preferably, such oils will have a low affinity for halocarbon refrigerant compositions, such as those described in the above mentioned patent. The term "lubricating oil" is used herein to describe all of these types of materials.

The halocarbon refrigerants used in the refrigeration system described hereinabove are well known in the art. These are as primarily chlorofluorocarbons, such as R12 and R22, i.e., dichlorodifluoromethane and chlorodifluoromethane, respectively. However, other halocarbons, such as straight fluorocarbons can be used. The protective sealing impregnant of this invention must be highly resistant to the more degrading and reactive R22 chlorofluorocarbon refrigerant, as a gas, or as a liquid in any concentration in a refined petroleum base or other lubricating oil, or in a foamed state, at temperatures of up to about 185° C.

The resin used as a base in the method of this invention, comprises a polar, essentially 100% solvent reactive, organic, unsaturated polyester resin. These usually liquid resins are of varying molecular weight and are capable of being dissolved in monofunctional vinyl diluents. The diluents are capable of reacting with the vinyl unsaturation of the polyester, to produce a solid polyester resin by a suitable, catalyzed, thermal curing polymerization process. These resins are generally made by condensation of polyhydroxy compounds with polybasic acids i.e., a glycol with a dicarboxylic acid. This base, straight polyester resin will contain an amount of a monofunctional vinyl reactive-diluent, having a viscosity of less than about 100 cps. at 25° C., effective to reduce the viscosity of the straight polyester resin to below about 3,000 cps. at 25° C. The preferred monofunctional diluents are alpha methyl styrene, styrene, vinyl toluene, methyl methacrylate and the like, and mixtures thereof. These monomers must be monofunctional, acting primarily as diluents, having viscosities of up to about 150 cps. at 25° C. The most preferred is methyl styrene.

The term "polyester resin", as used herein, is meant to include from about 5 wt.% to about 45 wt.% of monomers, and may also contain effective amounts of suitable catalysts, such as, for example 0.5 wt.% to 3 wt.% of peroxides, such as dicumyl peroxide, benzoyl peroxide, methyl ethyl ketone peroxide or any other suitable catalytic material. Such unsaturated polyester resins are well known in the art and are readily commercially available as general purpose polyester resins. Their properties and manufacture are thoroughly described in "Plastic Materials" by J. A. Brudson, 1966, pages 431 to 450, and in U.S. Pat. No. 3,644,161, herein incorporated by reference.

This type of unsaturated polyester resin is modified in the invention with from about 1 wt.% to about 70 wt.%, preferably 10 wt.% to 55 wt.% of a polyfunctional, i.e., di or tri-functional monomer modifier selected from either trimethylolpropane triacrylate (TMPTA), divinyl benzene (DVB), pentaerythritol triacrylate (PENTA) or their mixtures, preferably TMPTA or DVB because they are relatively inexpensive. Under 1 wt.%, the monomer modifier becomes ineffective in preventing physical and chemical resin degradation by R22. At over 70 wt.%, no further beneficial resistance to R22 is achieved, and the addition is uneconomical. The modified polyester must have a viscosity only up to about 1,000 cps. at 25° C. Over 1,000 cps. and it will be difficult to effectively impregnate the castings.

These three additional polyfunctional monomers used in this invention provide outstandingly effective and unique cross-linking during cure, resulting in effective chemical and physical resistance to solvent and chemical attack of the particularly highly reactive chlorodifluoromethane (R22), in gaseous form, or in liquid form or foam or solution admixture with refined petroleum base oils, or other refrigeration oils at temperatures of up to about 185° C., i.e., the resin will not dissolve or shatter, and will swell no more than about 5% after 3 months continuous contact at 175° C.

These three polyfunctional monomers are uniquely effective, in combination with the unsaturated polyester resin system, to cause cross-linking in a manner to prevent R22 degradation of the modified resin. They also assist in reducing the viscosity of the base resin system which is easily curable in air or oxygen. Other monomers, such as tetraethyleneglycol diacrylate and neopentyl glycol diacrylate (NPGDA) do not provide adequate protection from chlorodifluoromethane (R22).

In the case of divinyl benzene (DVB), the pure material is rather costly. DVB is available commercially, and its use at about 55 wt.% purity is effective, economic and more commercially feasible. The impurities are primarily diethylbenzene and ethylvinyl benzene. The term "divinyl benzene" is meant to here include not only substantially pure materials, but also the commercially available 50 to 75% pure grades. Herein, however, wt.% of divinyl benzene used in the polyester resin is calculated and expressed on the basis of 100% pure material. The TMPTA, DVB or PENTA modified polyesters of this invention easily "wet" porous metals, such as cast iron, steel, copper or aluminum, and produce very little to no gaseous or liquid by-products on curing. They therefore are extremely effective in plugging the pores and fissures of defective castings in the form of housing components, valves, etc. They are particularly useful for impregnating and coating all types of metal surfaces which may come in contact with harsh, chemical and other type corrosive environments.

Two impregnations of the porous, faulty casting are preferred. In impregnating a cast iron, steel, copper or aluminum casting, found to be faulty, shown as 20 in FIG. 2 of the drawings, the casting is first cleaned and degreased, generally in an aqueous detergent solution, or by vapor degreasing with chlorinated solvents such as hot perchloroethylene. This pretreatment removes any corrosion inhibitors and oily residues which can contaminate and inhibit the polymerization of the impregnating resin. These faulty castings will have wall portions of ¼ inch to ¾ inch thickness or more, with a porosity of up to about 35%, depending on the nature and type of fault. There is no pattern of uniformity in the types of faults which can be found in the faulty castings. These faults are generally caused by outgassing of dissolved or formed gases during the pouring and subsequent solidification of the molten metal in the casting mold.

Figure 2:
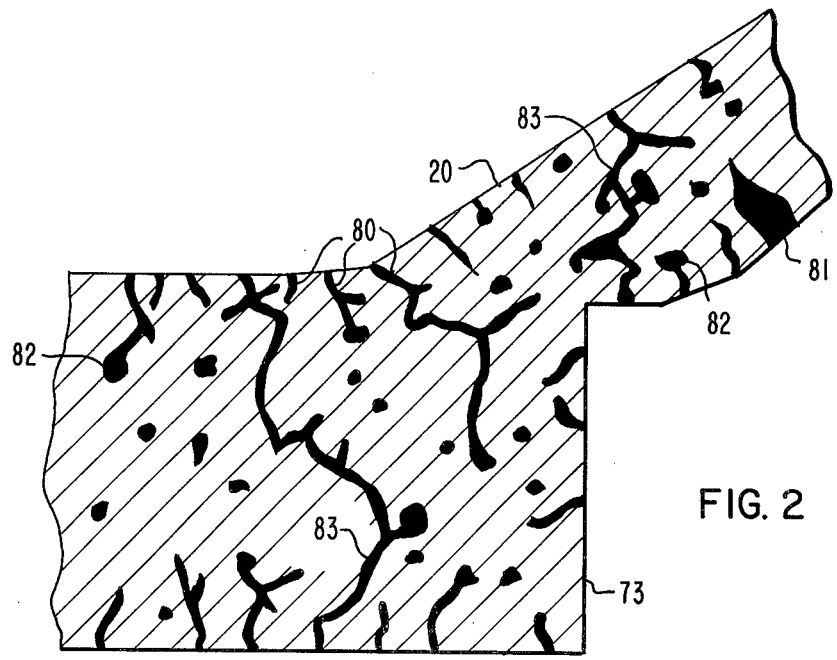
FIG. 2 is a microscopic cross-section of a faulty casting wall, showing the pores within the wall filled with blocking resin after impregnation.

After thoroughly cleaning and drying, the castings are lowered into a vacuum chamber and vacuum is applied for a prescribed period of time, usually an hour or two, to completely and thoroughly evacuate the interconnected pores, shown in FIG. 2 as micropores 80, cracks 81, and blow holes 82, which spread throughout the interior of the faulty regions of the casting at 73. These connected pores comprise about 0.01 vol. % to about 35 vol. % of the region of the castings considered to be faulty.

Following evacuation, and without breaking the vacuum, the castings are flooded with impregnating resin and completely submerged in the resin. At this point, air or nitrogen is introduced, followed by pressurization, usually from about 80 psi to 100 psi. The latter procedure assists in hydraulically forcing the impregnating resin into the interstices of the connected pores of the casting. The system is left in the chamber, usually overnight, whereupon the excess resin is returned to storage. As shown in FIG. 2, those faults 83, which can completely penetrate through the casting wall, which is usually about 0.25 inch to 0.75 inch thick, are filled with resin and made impervious to oil or other liquid penetration, seepage or leaking. After removal from the vacuum-pressure vessel, the resin is held in the casting interstices by capillary action and atmospheric pressure.

The next step, after draining excess surface resin, consists in the complete removal of excess resin from the surface of the casting. This can be done by mechanically scrubbing the casting in an aqueous detergent solution, or with an organic solvent. All bolt holes, ports, and recessed areas such as oil passages are then cleaned by jetting detergent solution through all internal passages, etc. No liquid resin should remain in oil passages, etc.

Following this, the casting is cured in air or a suitable oil for 2½ to 4 hours at approximately 135° C. to 160° C., to polymerize and cure the impregnating resin in the connected pores of the casting at 80, 81, 82 and 83, and thus converting the resin from a liquid to a solid. The final procedure consists in spraying the cleaned casting with a water soluble rust inhibitor, which prevents rusting and corrosion of critical machined surfaces during drying and subsequent curing, and later, in shipment. The casting may then be tested for gas leakage.

EXAMPLE 1

Samples of 100% solvent reactive, organic polyester resin (META) having a viscosity of 550 cps. at 25° C., containing about 15 wt.% to about 45 wt.% of a methyl styrene containing reactive-diluent, and about 2 wt.% dicumyl peroxide catalyst (sold commercially under the tradename Metaseal 19V5 by American Metaseal Co.) were tested as follows:
 (1) Alone, as a control;
 (2) With 12 wt.% of pure divinyl benzene (DVB), and with 20 wt.% and 50 wt.% of:
 (3) Trimethylolpropane triacrylate (TMPTA),
 (4) Tetraethyleneglycol diacrylate (TEGD),
 (5) Neopentylglycol diacrylate (NPGDA), and with 20 wt.% of:
 (6) Pentaerythritol triacrylate (PENTA),
to determine their stability in a 4 to 1 by weight mixture of Refrigerant R113 ($CCl_2FCClF_2$) and chloroform at 25° C., and in a 1:1 volume ratio of chlorodifluoromethane (R22)-oil at 175° C.

The catalyzed control resin and catalyzed sample resins 2 to 6 were cast and cured at 135° C. into rods from 0.5 to 1 inch long and about 0.125 inch in diameter. For the R113 test, sample rods were placed in small screw-top bottles of about 0.75 inch diameter. The R113 solvent solution was added. This R113 solution behaves in solvent attack very much like chlorodifluoromethane (R22). This solvent consisted of 4 parts by weight of Refrigerant R113 ($CCl_2FCClF_2$) which boils at 47.6° C., and 1 part by weight of chloroform ($CHCl_3$) which boils at 61° C. This was used as a room temperature screening test.

In the high temperature R22 test, the candidate resin, in the form of the described rods, was sealed off with R22-oil mixtures. In these tests, the test specimen and oil were placed into 0.28 inch diameter glass tubes, which were then constricted at the open end down to a capillary size opening. The tube was then placed under vacuum to remove all the air, and the oil frozen under liquid nitrogen. While the tube was still cold, R22 was admitted as a gas into the tube where it condenses as a liquid and freezes. After R22 was added in a 1:1 vol. rate with the oil, the tube was sealed off at the constricted end to form 7 inch long sealed tubes.

Figure 3:
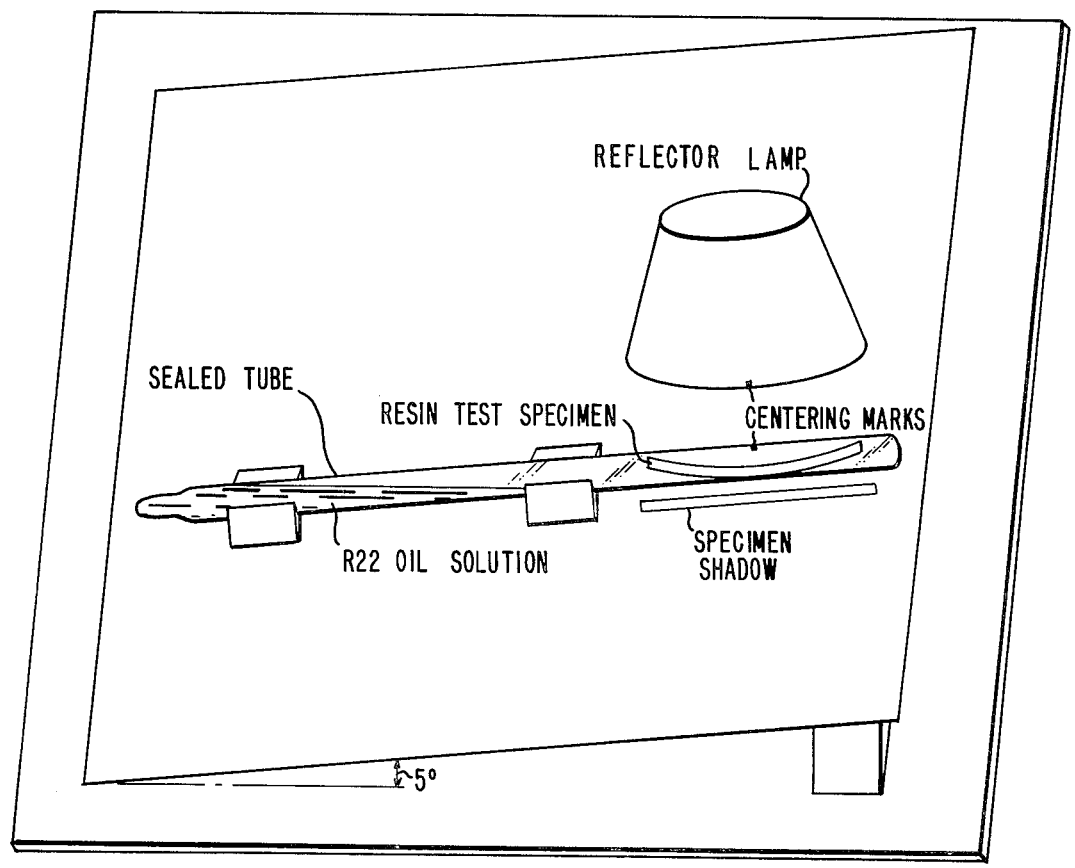
FIG. 3 shows a diagram of the method used to measure the linear expansion of the test rods of Example 1, in the high temperature R22-oil test.

Both of these tests were concerned with solvent attack, cracking and shattering of the sample and swell, in the refrigerant or solvent environment. With the R113-chloroform test, the rod samples were periodically removed and measured. Increase in the length of the rods in the R22-oil test was followed by using a "shadow" measurement technique, as shown in FIG. 3. The R22-oil linear expansion tests were run after heat aging the samples at 175° C., in an aluminum heating block, for from 3 to 24 weeks. During this heat aging, the samples were contacted by the R22-oil solvent and by the R22 in the gas phase.

The sealed tube, containing the sample to be measured, is placed on two identical V-notched steel blocks positioned on a piece of white paper display board. A standard uniform reflecting light source is placed at a fixed height above the tube and centered over the midpoint of the resin sample. The whole assembly is then inclined to a 5° angle, as shown in FIG. 3, so that the liquid R22-oil will drain away from the resin sample. The sealed tube is always placed in the same position so that the sample is always in the same plane during measurement.

When the light source is turned on, the shadow of the resin test specimen appears on the white display board and can be easily measured using a caliper. Since all of the distances, light source position, centering and sample position are held constant, then any change in the dimension of the shadow is proportional to the actual change in the dimensions of the sample. The values shown in Table 1 below are the actual shadow measurements of the resin specimens. In many cases, however, the sample resin swelled and elongated to the point of shattering, indicating complete unsuitability for contact with R22.

the results obtained on samples 2, 3 and 3'. These three polyfunctional monomer modifiers are effective to cause R22 resistance in a catalyzed, styrene diluted polyester system.

The sample 2, 3, 3' and 6 modified polyester compositions were then tested for ability to seal highly porous plug-type sintered iron cylinders, ½ inch long and ¼ inch diameter. These porous sintered iron test specimens had a porosity of from 19% to 27%. A 1/32 inch diameter hole was drilled down the center of the cylinder extending inward for 11/32 inch. These porous cylinder samples simulating a region of rejected faulty porous ferrous casting, were vacuum pressure impregnated with sample 2, 3, 3' and 6 DVB, TMPTA and PENTA modified resins of this invention, and subsequently cured in an oven at about 135° C. The center hole was redrilled to remove excess resin and to expose the metal wall. The cylinders were then reimpregnated, the resins again cured at about 135° C., and the center holes redrilled.

The modified polyester resin impregnated test cylinders were placed in glass tubes with an equal volume mixture of chlorodifluoromethane (R22) and base lubricating oil. The tubes were sealed as described above for the R22 test and the sample cylinders heat aged at 175° C. The tubes were periodically opened and sample

TABLE 1

| SAMPLE & COMPOSITION | | R113/CHLOROFORM at 25° C. LENGTH (mil) | | R22/OIL at 175° C. LENGTH (mil) | |
|---|---|---|---|---|---|
| | | Initial | Final | Initial | Final |
| 1* | META | 601 | (a) pieces | 862 | (c) pieces |
| 2 | META/DVB 22:3 | — | — | 1087 | (b) 1109 |
| 3 | META/TMPTA 5:5 | 568 | (b) 572 | 891 | (c) 915 |
| 3' | META/TMPTA 8:2 | 559 | (b) 566 | 890 | (c) 900 |
| 4* | META/TEGDA 5:5 | 537 | (a) shattered | 877 | (c) pieces |
| 4'* | META/TEGDA 8:2 | 585 | (b) 618 | 974 | (c) pieces |
| 5* | META/NPGDA 5:5 | 714 | (a) pieces | 704 | (a) pieces |
| 5'* | META/NPGDA 8:2 | 742 | (a) pieces | 828 | (a) pieces |
| 6 | META/PENTA 8:2 | 992 | (b) 994 | — | — |

(a) 3 weeks
(b) 10 weeks
(c) 24 weeks
*comparative examples

These results substantiate the dramatic increase in resistance to R22 which may be imparted to polyester resins by incorporation of DVB, TMPTA and PENTA polyfunctional modifiers. Such modified polyester materials would be even more resistant to the less reactive R12 halocarbon refrigerants. As can be seen, TEGDA, NPGDA and styrene containing META could not resist R22 attack. The % increase in swelling in R22 after about 3 mo. aging for samples 2, 3 and 3' is only 2%, 2.7% and 1.17%, respectively. Because of the excellent results with sample 6 (PENTA) in the R113 screen test, it was not run in the much more expensive R22 test. The results would be expected to be similar to cylinders were tested at 90 psi. air pressure, to see if they passed, i.e., to see if there was any air leakage. In this test, a gasketed fitting was attached to the drilled end of the test cylinder, air was fed to the drilled hole, and the cylinders were checked under water for air leakage. They were then thoroughly dried and resealed in tubes in contact with the R22-oil, for further aging. The results of these tests are shown in Table 2 below:

TABLE 2

| | | R22/OIL at 175° C. | | |
|---|---|---|---|---|
| SAMPLE | IMPREGNATION COMPOSITION | INITIAL | 9 MONTHS | 14 MONTHS |
| 2 | META/DVB 22:3 | passed | passed | passed |
| 3 | META/TMPTA 5:5 | passed | passed | passed |
| 3' | META/TMPTA 8:2 | passed | passed | passed |
| 6 | META/PENTA 8:2 | passed | passed | passed |

Similar experiments were conducted on samples 3, 3' and 6 with dichlorodifluoromethane (R12) and base lubricating oil, and the results of these tests are shown in Table 3 below:

TABLE 3

| | R12/OIL at 175° C. | | |
|---|---|---|---|
| SAMPLE IMPREGNATION COMPOSITION | INITIAL | 5 MONTHS | 14 MONTHS |
| 3   META/TMPTA 5:5 | passed | passed | passed |
| 3'  META/TMPTA 8:2 | passed | passed | passed |
| 6   META/PENTA 8:2 | passed | passed | passed |

As can be seen, the DVB, TMPTA and PENTA crosslinking modifiers are surprisingly effective in reducing R22-oil solvent intrusion and chemical and physical attack of the polyester resin system which impregnates the pores distributed throughout the casting. They also are effective in retaining R12 resistance. Use of about 12 wt.% DVB and 20 wt.% TMPTA and PENTA modifiers is preferred. These amounts produce a resin characterized by having as good chlorodifluoromethane resistance as is the case when higher amounts are used.

To test storage stability, a mixture of META/TMPTA at a 7:3 ratio, i.e., approximately 30 wt.% TMPTA was made, containing about 2.0 wt.% dicumyl peroxide catalyst. It was placed in containers at 25° C. The initial viscosity of the 7:3 mixture was about 320 cps. at 25° C. and remained essentially the same for 10 weeks. This demonstrates the catalyzed storage life of such a resin system as being commercially useful for impregnating large castings wherein resin is stored for long periods of time between use.

EXAMPLE 2

Three very porous, defective concave cylinder head castings, about 12 inch×8 inch×½ inch thick, with a 1 inch thick flange, made for use on R22 containing reciprocating compressors, previously rejected because of porosity in critical areas, were obtained. These were degreased and cleaned using hot perchloroethylene solution and double vacuum pressure impregnated, while fully submerged, with a composition similar to sample 3 of Example 1, i.e., META/TMPTA at 7:3 ratio, using the same procedure as in Example 1. After cleaning off excess resin with detergent solution, the castings were cured at 135° C.

The flange was gasketed and sealed with putty onto a plate with a fitting for helium gas feed. The castings were then checked for leakage by evacuating air from the inside of the casting and feeding helium around the outside and testing for helium in the vacuum stream using a helium leak detector. The castings were found leak-tight to the limit of detection (about $2\times10^{-10}$ cc/sec. leakage). This shows that the polyester resin modified with trimethylolpropane triacrylate (TMPTA) was extremely effective in filling and plugging all the cracks, and micropores of the faulty porous casting, making it impervious to gasses, so that it could now be used as a housing for the refrigeration apparatus for which it was fabricated. Equally outstanding results would be achieved using DVB and PENTA as modifiers.

We claim:

1. A metal casting containing connected pores, said pores filled with a cured halocarbon resistant barrier resin consisting essentially of the cured resinous admixture of (1) an unsaturated polyester resin and (2) from about 1 wt.% to about 70 wt.% of a polyfunctional monomer modifier selected from the group consisting of trimethylolpropane triacrylate, divinyl benzene, pentaerythritol triacrylate and mixtures thereof; said admixture prior to curing having a viscosity of up to about 1,000 cps. at 25° C., said cured modified resin characterized as being resistant to chemical and solvent attack by chlorodifluoromethane and dichlorodifluoromethane, the cured, modified resin making the casting impervious to gases.

2. The casting of claim 1, wherein the polyfunctional monomer modifier content of the admixture ranges from about 10 wt.% to about 50 wt.%.

3. The casting of claim 1, wherein the metal casting prior to resin filling is up to about 35% porous.

4. The casting of claim 1, wherein the cured barrier resin is resistant to a solvent comprising refined petroleum oil and chlorodifluoromethane, at temperatures up to about 185° C., the modifier being effective to cause crosslinking during curing in a manner providing resistance to chemical and solvent attack by chlorodifluoromethane.

5. The casting of claim 2, wherein the polyfunctional monomer modifier of the admixture is trimethylolpropane triacrylate and the metal is iron.

6. A method of making a porous substrate resistant to halocarbons and impervious to gases comprising the steps of:
   (1) providing a casting having up to about 35% porosity, containing connected pores;
   (2) cleaning the casting;
   (3) impregnating the casting at least one time with a resinous admixture consisting essentially of an unsaturated polyester resin and from about 1 wt.% to about 70 wt.% of a polyfunctional monomer modifier selected from the group consisting of trimethylolpropane triacrylate, divinyl benzene, pentaerythritol triacrylate and mixtures thereof, said admixture having a viscosity of up to about 1,000 cps. at 25° C. to fill the connected pores of the casting; and
   (4) curing the modified resinous admixture, to provide a solid barrier resin in the connected pores, said cured, modified resin characterized as being resistant to solvent attack by chlorodifluoromethane and dichlorodifluoromethane, the cured, modified resin making the casting impervious to gases.

7. The method of claim 6 wherein the casting is cleaned between steps (3) and (4) and the polyfunctional monomer modifier content of the resin is from about 10 wt.% to about 50 wt.%.

8. The method of claim 6, wherein the cured barrier resin is resistant to a solvent comprising refined petroleum oil and chlorodifluoromethane, at temperatures up to about 185° C., the modifier being effective to cause crosslinking during curing in a manner providing resistance to chemical and solvent attack by chlorodifluoromethane.

9. The method of claim 7, wherein the polyfunctional monomer modifier in the resin is trimethylolpropane triacrylate.

* * * * *